US010809016B2

(12) United States Patent
Kironn et al.

(10) Patent No.: US 10,809,016 B2
(45) Date of Patent: Oct. 20, 2020

(54) HEAT EXCHANGER SYSTEM WITH ADDITIVELY MANUFACTURED HEAT TRANSFER TUBE THAT FOLLOWS A NON-LINEAR PATH

(71) Applicant: UNITED TECHNOLOGIES CORPORATION, Hartford, CT (US)

(72) Inventors: Lexia Kironn, Rocky Hill, CT (US); Wendell V Twelves, Jr., Glastonbury, CT (US); Evan Butcher, Manchester, CT (US); Joe Ott, Enfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 892 days.

(21) Appl. No.: 14/615,777

(22) Filed: Feb. 6, 2015

(65) Prior Publication Data

US 2016/0231064 A1 Aug. 11, 2016

(51) Int. Cl.
*F28F 1/12* (2006.01)
*F28F 1/00* (2006.01)
*F28F 1/02* (2006.01)
*B23P 15/26* (2006.01)
*F28D 21/00* (2006.01)

(52) U.S. Cl.
CPC ............ *F28F 1/12* (2013.01); *B23P 15/26* (2013.01); *F28F 1/006* (2013.01); *F28F 1/025* (2013.01); *F28D 2021/0021* (2013.01); *F28F 2255/18* (2013.01)

(58) Field of Classification Search
CPC .... F28F 1/32; F28F 1/325; F28F 1/025; F28F 1/006; F28F 1/12; F28F 2255/18; F28D 7/082; F28D 2021/0021; B23P 15/26; B33Y 99/00; B33Y 80/00

USPC .................................................. 165/151, 177
See application file for complete search history.

(56) References Cited

U.S. PATENT DOCUMENTS

| | | | | |
|---|---|---|---|---|
| 1,913,417 A | * | 6/1933 | Ulrich | B21C 37/155 122/360 |
| 3,136,038 A | * | 6/1964 | Huggins et al. | F28D 7/08 165/151 |
| 3,596,495 A | * | 8/1971 | Huggins | B21D 53/08 165/109.1 |
| 4,474,001 A | * | 10/1984 | Griffin et al. | F02C 7/16 60/204 |
| 5,269,133 A | | 12/1993 | Wallace | |
| 5,269,135 A | | 12/1993 | Vermejan et al. | |
| 6,058,696 A | | 5/2000 | Nikkanen et al. | |
| 6,106,229 A | | 8/2000 | Nikkanen et al. | |
| 6,698,687 B2 | | 3/2004 | Daggett | |

(Continued)

FOREIGN PATENT DOCUMENTS

WO 2011115883 9/2011
WO 2013163398 10/2013

OTHER PUBLICATIONS

European search report for Application No. 16154629.6-1602 dated May 31, 2016.

*Primary Examiner* — Tho V Duong
(74) *Attorney, Agent, or Firm* — Bachman & LaPointe, P.C.

(57) ABSTRACT

A heat exchanger system for a gas turbine engine includes a plurality of fins; and an additively manufactured heat transfer tube that extends through the plurality of fins, the additively manufactured heat transfer tube follows a non-linear path though said plurality of fins.

15 Claims, 5 Drawing Sheets

(56) References Cited

U.S. PATENT DOCUMENTS

| | | | |
|---|---|---|---|
| 7,398,641 B2 | 7/2008 | Stretton et al. | |
| 7,631,485 B2 | 12/2009 | Suciu et al. | |
| 7,726,390 B2 * | 6/2010 | Sucke et al. | B21C 35/023 |
| | | | 165/177 |
| 7,810,312 B2 | 10/2010 | Stretton et al. | |
| 7,810,552 B2 | 10/2010 | Slaughter | |
| 7,866,372 B2 | 1/2011 | Slaughter | |
| 7,866,377 B2 | 1/2011 | Slaughter | |
| 7,971,438 B2 | 7/2011 | Taylor et al. | |
| 7,997,062 B2 | 8/2011 | Sun et al. | |
| 8,181,443 B2 | 5/2012 | Rago et al. | |
| 8,661,783 B2 | 3/2014 | Foster et al. | |
| 8,784,047 B2 | 7/2014 | Elder et al. | |
| 9,134,072 B2 | 9/2015 | Roisin et al. | |
| 9,200,855 B2 | 12/2015 | Kington et al. | |
| 2013/0206374 A1 | 8/2013 | Roisin et al. | |
| 2013/0236299 A1 | 9/2013 | Kington et al. | |
| 2014/0360698 A1 * | 12/2014 | Waldman et al. | B22F 3/1055 |
| | | | 165/81 |

* cited by examiner

HEAT EXCHANGER SYSTEM WITH ADDITIVELY MANUFACTURED HEAT TRANSFER TUBE THAT FOLLOWS A NON-LINEAR PATH

BACKGROUND

The present disclosure relates to heat exchangers and, more particularly, to an additively manufactured heat transfer tube that follows a non-linear path though a plurality of fins.

Gas turbine engines, such as those that power modern commercial and military aircraft, typically include a ducted heat exchanger system with a heat exchanger and associated equipment to exchange engine heat with airflow. The gas turbine engine architecture typically dictates the ducted heat exchanger placement within a nacelle that encloses the engine.

Conventional heat exchangers have uniform internal and external geometries due in part to the complexity of manufacture. Although effective, the heat exchanger may be subject to local stress concentrations or other structural requirements that drive increases in thickness or material changes for the entire heat exchanger. This may result in increased weight and cost. The heat exchanger is also typically constructed of dissimilar metals that expand at differing rates when exposed to varying thermal boundary conditions typical of a gas turbine engine environment that may further limit the life of the heat exchanger.

SUMMARY

A heat exchanger system according to one disclosed non-limiting embodiment of the present disclosure includes an additively manufactured heat transfer tube that extends through the plurality of fins, the additively manufactured heat transfer tube follows a non-linear path though the plurality of fins.

A further embodiment of the present disclosure includes, wherein the plurality of fins is additively manufactured.

A further embodiment of any of the foregoing embodiments of the present disclosure includes, wherein the additively manufactured heat transfer tube is serpentine.

A further embodiment of any of the foregoing embodiments of the present disclosure includes, wherein the additively manufactured heat transfer tubes include a wall thickness that differs along the length of the additively manufactured heat transfer tubes.

A further embodiment of any of the foregoing embodiments of the present disclosure includes a multiple of additively manufactured heat transfer features that extend from an inner surface of the additively manufactured heat transfer tubes.

A further embodiment of any of the foregoing embodiments of the present disclosure includes, wherein at least one the additively manufactured heat transfer features is tree-shaped.

A further embodiment of any of the foregoing embodiments of the present disclosure includes a multiple of additively manufactured heat transfer features that extend from an outer surface of the additively manufactured heat transfer tubes.

A further embodiment of any of the foregoing embodiments of the present disclosure includes, wherein at least one the additively manufactured heat transfer features is tree-shaped.

A further embodiment of any of the foregoing embodiments of the present disclosure includes, wherein the heat exchanger system is mounted within a duct of a gas turbine engine nacelle.

A heat exchanger system according to another disclosed non-limiting embodiment of the present disclosure includes an additively manufactured heat transfer tube that extends through the plurality of additively manufactured fins, the additively manufactured heat transfer tube follows a non-linear path though the additively manufactured plurality of additively manufactured fins.

A further embodiment of any of the foregoing embodiments of the present disclosure includes, wherein the additively manufactured heat transfer tubes include a wall thickness that differs along the length of the additively manufactured heat transfer tubes.

A further embodiment of any of the foregoing embodiments of the present disclosure includes a multiple of additively manufactured heat transfer features that extend from an inner surface of the additively manufactured heat transfer tubes.

A further embodiment of any of the foregoing embodiments of the present disclosure includes, wherein at least one the additively manufactured heat transfer features is tree-shaped.

A further embodiment of any of the foregoing embodiments of the present disclosure includes a multiple of additively manufactured heat transfer features that extend from an outer surface of the additively manufactured heat transfer tubes.

A further embodiment of any of the foregoing embodiments of the present disclosure includes, wherein at least one the additively manufactured heat transfer features is tree-shaped.

A further embodiment of any of the foregoing embodiments of the present disclosure includes, wherein the additively manufactured heat transfer features is located between the plurality of fins.

A further embodiment of any of the foregoing embodiments of the present disclosure includes, wherein the heat exchanger is located within a fan nacelle.

A further embodiment of any of the foregoing embodiments of the present disclosure includes, wherein the heat exchanger is located within a core nacelle.

A method of manufacturing a heat exchanger system according to another disclosed non-limiting embodiment of the present disclosure includes additively manufacturing a heat transfer tube that extends through a plurality of additively manufactured fins, the additively manufactured heat transfer tube following a non-linear path though the additively manufactured plurality of additively manufactured fins.

A further embodiment of any of the foregoing embodiments of the present disclosure includes additively manufacturing a multiple of heat transfer features that extend from an outer surface of the additively manufactured heat transfer tubes.

A further embodiment of any of the foregoing embodiments of the present disclosure includes additively manufacturing a multiple of heat transfer features that extend from an inner surface of the additively manufactured heat transfer tubes.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
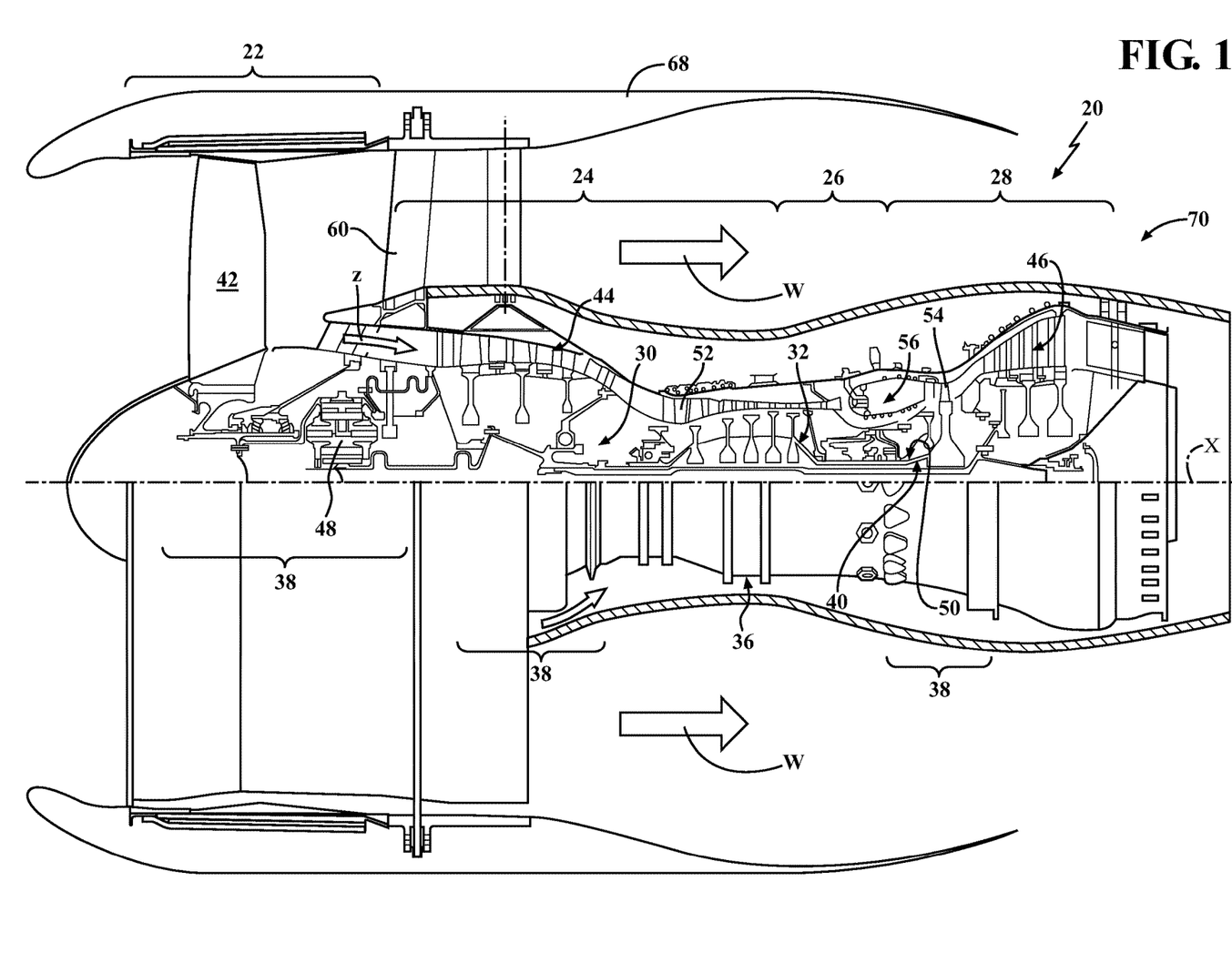
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) architectures.

The engine 20 generally includes a low spool 30 and a high spool 32 mounted for rotation about an engine central longitudinal axis relative to an engine case structure 36. The low spool 30 generally includes an inner shaft 40 that interconnects a fan 42, a low pressure compressor ("LPC") 44, and a low pressure turbine ("LPT") 46. The inner shaft 40 drives the fan 42 directly or through a geared architecture 48 to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric, and rotate about the engine central longitudinal axis.

Core airflow is compressed by the LPC 44, then the HPC 52, mixed with the fuel and burned in the combustor 56, then expanded over the HPT 54 and the LPT 46 along a core flowpath "Z". The LPT 46 and HPT 54 rotationally drive the respective low spool 30 and high spool 32 in response to the expansion. The main engine shafts 40, 50 are supported at a plurality of points by bearing systems 38 within the case structure 36.

Figure 2:
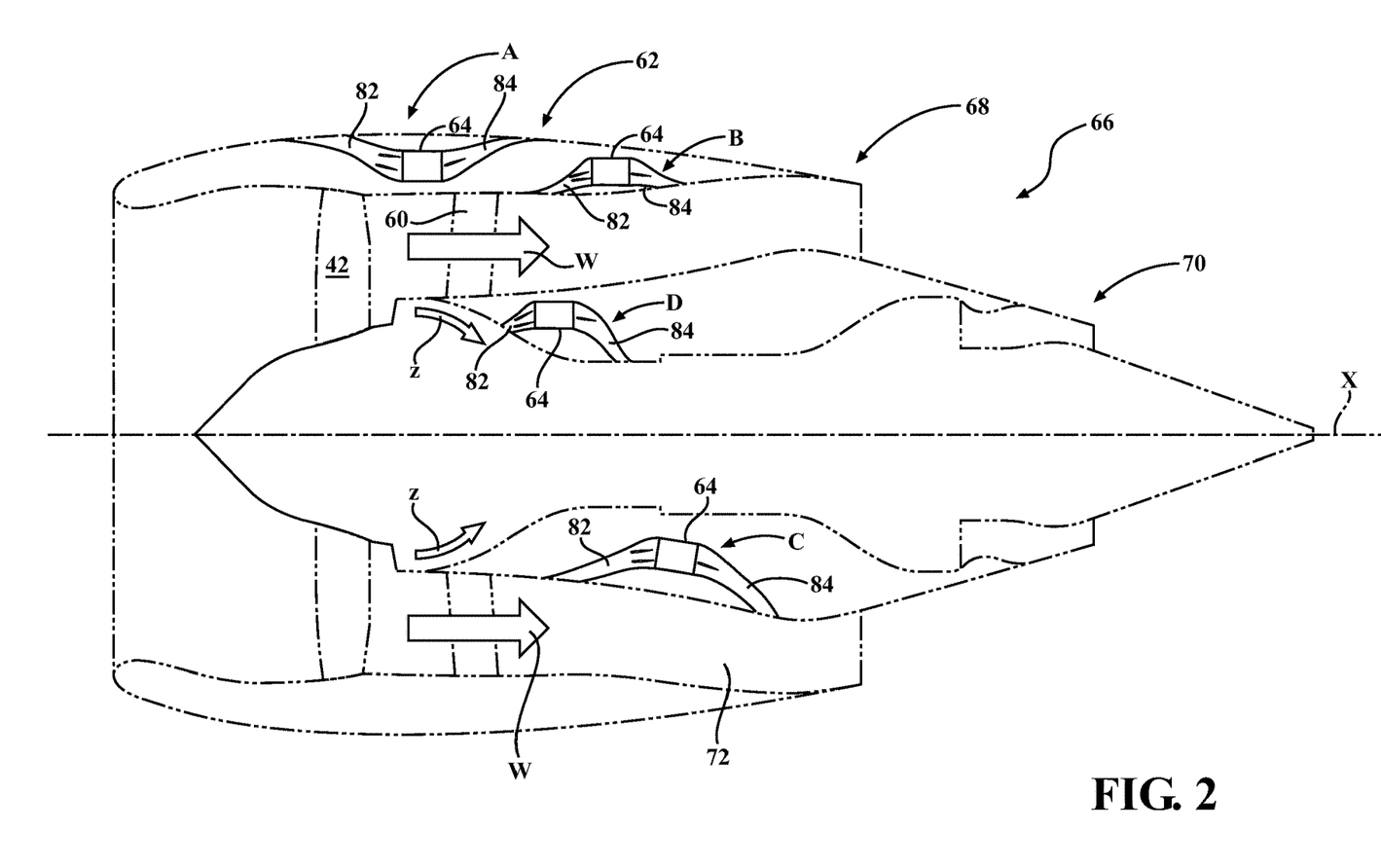
FIG. 2 is a schematic view of a nacelle assembly with a multiple of example locations for a ducted heat exchanger system that exchange flows with a common air stream.

With reference to FIG. 2, the fan 42 drives air along a fan bypass flowpath, "W" past a Fan Exit Guide Vane system 60. A ducted heat exchanger system 62 includes an additive manufactured heat exchanger 64 that may be at least partially integrated into a nacelle assembly 66 such as a fan nacelle 68, a core nacelle 70, a bifurcation 72, the Fan Exit Guide Vane system 60 or any combination thereof but still considered as in communication with the fan bypass flowpath W as defined herein. It should be appreciated that although a nacelle assembly 66 will be utilized in the illustrated embodiment, various other environments may also be used to contain the ducted heat exchanger system 62.

The additive manufactured heat exchanger 64 may locate an inlet 82 and an exit 84 in communication with the same air stream. For example, the inlet 82 and exit 84 may be located within the fan nacelle 68 for communication with a free stream airflow (illustrated schematically as position A); within the fan nacelle 68 for communication with a bypass stream airflow through the fan bypass flowpath "W" (illustrated schematically as position B); within the core nacelle 70 for communication with the bypass stream airflow (illustrated schematically as position C); and/or with the core engine (illustrated schematically as position D). It should be appreciated that various positions and flow paths may be alternatively, or additionally, provided.

Figure 3:
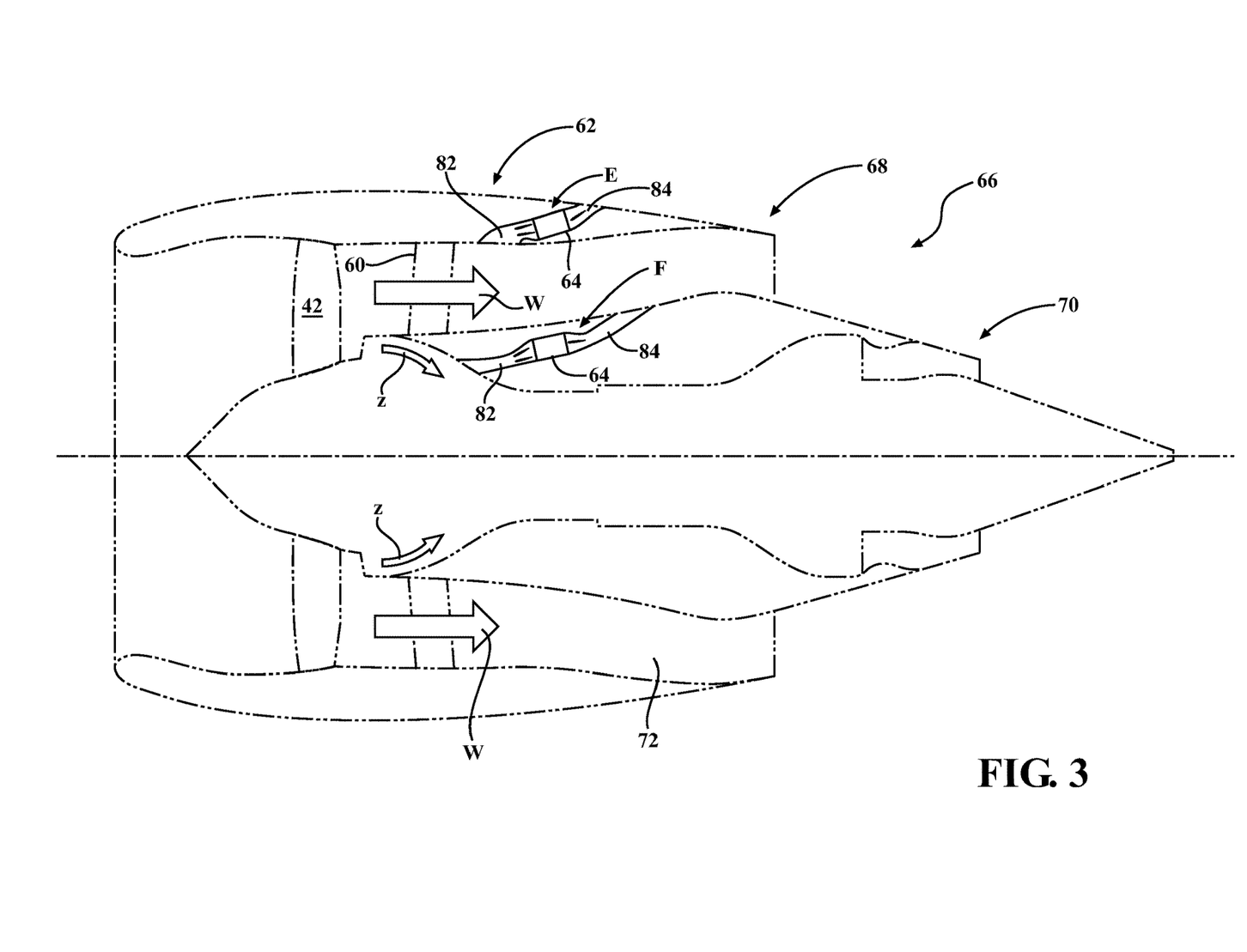
FIG. 3 is a schematic view of a nacelle assembly with a multiple of example locations for a ducted heat exchanger system that exchange flows with different air streams.

With reference to FIG. 3, the additive manufactured heat exchanger 64 may locate the inlet 82 and the exit 84 in communication with different air streams. For example, the additive manufactured heat exchanger 64 may be located within the fan nacelle 68 with the inlet 82 in communication with the bypass stream airflow through the fan bypass flowpath "W" and the exit 84 in communication with the free stream airflow (illustrated schematically as position E). Alternatively, the additive manufactured heat exchanger 64 may be located within the core nacelle 70 with the inlet 82 in communication with the core engine such as a stage of the LPC 44 and the exit 84 in communication with the bypass stream airflow (illustrated schematically as position F). It should be appreciated that various positions and flow paths may be alternatively, or additionally, provided.

Figure 4:
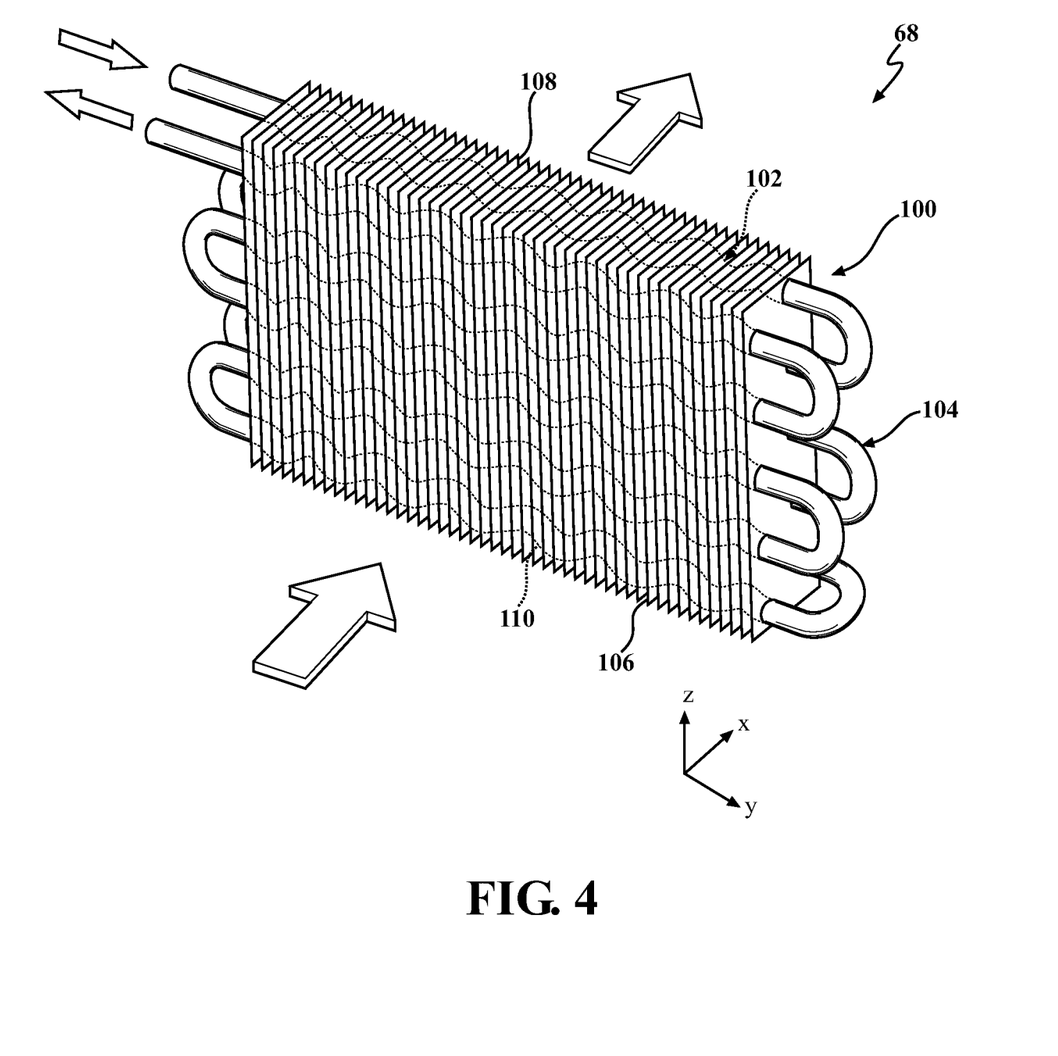
FIG. 4 a perspective view of a heat exchanger according to one disclosed non-limiting embodiment.

With reference to FIG. 4, the additive manufactured heat exchanger 64 in one disclosed non-limiting embodiment includes a fin tube heat exchanger core 100 with a plurality of fins 102 arranged in parallel to form flow passages for a first fluid such as air and heat transfer tubes 104 that penetrate the fins 102. The fin tube heat exchanger core 100 is configured to exchange heat between a second fluid that flows in the heat transfer tubes 104 and the first fluid air A flowing along the surfaces of the fins 102. The second fluid is, for example, a liquid such as fuel, oil, or other.

The fins 102 each have a leading edge 106 and a trailing edge 108. In this description, a direction in which the fins 102 are arranged is defined as a height direction; a direction parallel to the leading edge 106 is defined as a row direction; and a direction perpendicular to the height direction and the row direction is defined as an air flow direction. In other words, the row direction is a direction perpendicular to both the height direction and the airflow direction. The airflow direction is perpendicular to the longitudinal direction of the fins 102. The longitudinal direction of the fin 102 coincides with the row direction. In one embodiment, the fins 102 are arranged at a constant spacing (fin pitch FP). However, the spacing between two fins 102 adjacent to each other in the height direction does not necessarily have to be constant and may vary. The airflow direction, the height direction and the row direction correspond to X direction, Y direction and Z direction, respectively. In the one embodiment, the fins have symmetrical configuration, however, other geometries may be provided.

The heat transfer tubes 104 extend through the fins 102 to form a cross-flow heat exchanger in which the fluids travel roughly perpendicular to one another. Heat transfer in heat exchanger applications depends on residence time, velocity and tube length (ignoring integrated fins). Residence time for a vessel or pipe can be defined as the average time a fluid particle passes through the vessel during a continuous process.

Figure 5:
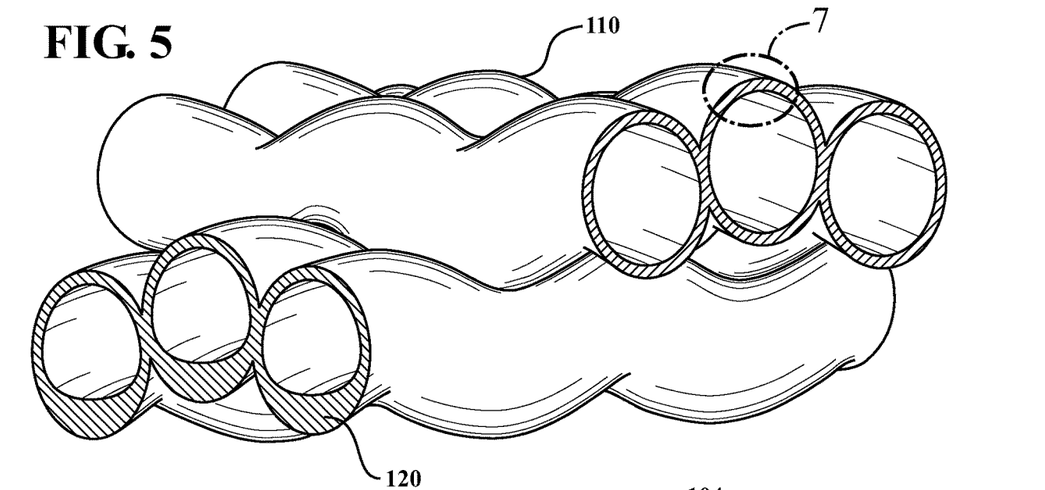
FIG. 5 is a sectional view of an example heat exchanger core according to one disclosed non-limiting embodiment.

In one disclosed non-limiting embodiment, the heat transfer tubes 104 include a circuitous length 110 to increase residence time of the traveled fluid and thus enhance cooling rate of the fluid. In other words, the circuitous length 110 follow a non-linear path though the fins 102. Circuitous as defined herein may include serpentine, waved, sinusoidal, and other non-linear shapes and paths.

The fins 102 and the heat transfer tubes 104 are readily manufactured with an additive manufacturing process that includes but are not limited to, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD) and Laser Powder Bed Fusion (LPBF).

The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum and others in atomized powder material form. Alloys such as 625, 718 and 230 may have specific benefit for parts that operate in high temperature environments, such as, for example, environments typically encountered by aerospace and gas turbine engine components.

The additive manufacturing process facilitates manufacture of the relatively complex geometry to minimize assembly details and multi-component construction as the additive manufacturing process fabricates or "grows" components using three-dimensional information, for example a three-dimensional computer model. The three-dimensional information is converted into a plurality of slices, each slice defining a cross section of the component for a predetermined height of the slice. The additive manufactured component is then "grown" slice by slice, or layer by layer, until finished.

Figure 6:
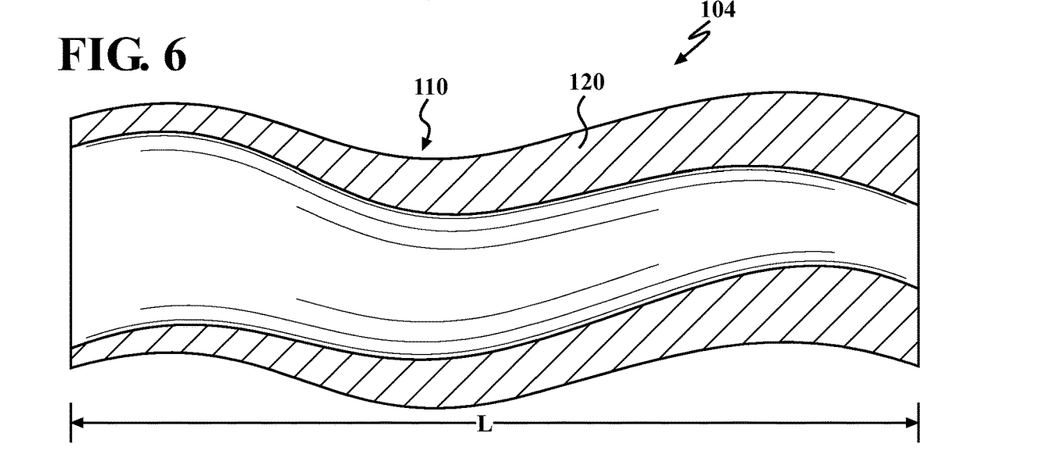
FIG. 6 is a cross-sectional view of the heat exchanger of FIG. 6.

In another disclosed non-limiting embodiment, the additively manufactured heat transfer tubes 104 include a wall thickness 120 that differs along a length "L" of the additively manufactured heat transfer tubes 104 (FIG. 6). Further, various surface finishes may be readily provided via additive manufacturing.

Figure 7:
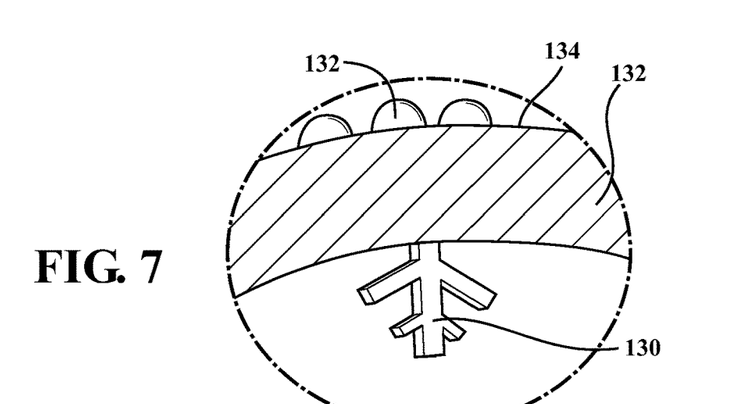
FIG. 7 is a sectional view of a heat exchanger system according to another disclosed non-limiting embodiment.

In another disclosed non-limiting embodiment, the additively manufactured heat transfer tubes 104 include additively manufactured heat transfer features 130. The additively manufactured heat transfer features 130, may, for example, extend from an inner surface 132 of the additively manufactured heat transfer tubes 104 (FIG. 7). Alternatively, or in addition thereto, additively manufactured heat transfer features 132 extend from an external surface 134 of the additively manufactured heat transfer tubes 104 located, for example, between the fins 102. In one illustrated example, the additively manufactured heat transfer features 130 are tree-shaped, however, other shapes such as pins, bumps, ridges, chevrons, etc., may be provided.

In comparison to straight tubes, circuitous additive manufactured heat transfer tubes 104 promote higher residence time of the traveled fluid which is directly proportional to the amount of heat or energy exchanged between fluid agents. Implementation of the circuitous additive manufactured heat transfer tubes 104 can intensify fluid cooling rates and provide more efficient system benefits. The circuitous additive manufactured heat transfer tubes 104 are non-linear and result in a size reduction of the overall ducted heat exchanger system 64 to also facilitate, for example, ideal nacelle aero curves. Cost and weight reductions may also be realized due to the reduced system size for equivalent heat exchange capability of a system with linear tubes.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A heat exchanger system, comprising:
an additively manufactured plurality of fins arranged in parallel to form flow passages for a first fluid along an air flow direction, each of the plurality of fins have a leading edge and a trailing edge parallel to the leading edge, the plurality of fins stacked to define a height direction, a direction parallel to the leading edge is defined as a row direction, and a direction perpendicular to the height direction and the row direction is defined as the air flow direction, each leading edge and trailing edge of the plurality of fins arranged transverse to the air flow direction; and a serpentine additively manufactured heat transfer tube through said stack of the plurality of fins transverse to the air flow direction, said serpentine additively manufactured heat transfer tube follows a non-linear path through said plurality of fins between the leading edge and trailing edge of the plurality of fins, the serpentine additively manufactured heat transfer tube operable to communicate a second fluid and form a cross-flow heat exchanger.

2. The heat exchanger system as recited in claim 1, wherein said additively manufactured heat transfer tubes include a wall thickness that differs along the length of the additively manufactured heat transfer tubes.

3. The heat exchanger system as recited in claim 1, further comprising a multiple of additively manufactured heat transfer features that extend from an inner surface of said additively manufactured heat transfer tubes.

4. The heat exchanger system as recited in claim 3, wherein at least one said additively manufactured heat transfer features is tree-shaped.

5. The heat exchanger system as recited in claim 1, further comprising a multiple of additively manufactured heat transfer features that extend from an outer surface of said additively manufactured heat transfer tubes.

6. The heat exchanger system as recited in claim 5, wherein at least one said additively manufactured heat transfer features is tree-shaped.

7. The heat exchanger system as recited in claim 1, wherein said heat exchanger system is mounted within a duct of a gas turbine engine nacelle.

8. A heat exchanger system, comprising:

an additively manufactured plurality of fins arranged in parallel to form flow passages for a first fluid along an air flow direction, each of the plurality of fins have a leading edge and a trailing edge parallel to the leading edge, the plurality of fins stacked to define a height direction, a direction parallel to the leading edge is defined as a row direction, and a direction perpendicular to the height direction and the row direction is defined as the air flow direction, each leading edge and trailing edge of the plurality of fins arranged transverse to the air flow direction; and a serpentine additively manufactured heat transfer tube through said stack of the plurality of additively manufactured fins transverse to the air flow direction, said serpentine additively manufactured heat transfer tube follows a non-linear path through said plurality of additively manufactured fins between the leading edge and trailing edge of the plurality of fins, the serpentine additively manufactured heat transfer tube operable to communicate a second fluid and form a cross-flow heat exchanger, wherein said heat exchanger is a ducted heat exchanger system located within a nacelle, said air flow direction directed through a duct of said ducted heat exchanger system.

9. The heat exchanger system as recited in claim 8, wherein said additively manufactured heat transfer tubes include a wall thickness that differs along the length of the additively manufactured heat transfer tubes.

10. The heat exchanger system as recited in claim 8, further comprising a multiple of additively manufactured heat transfer features that extend from an inner surface of said additively manufactured heat transfer tubes.

11. The heat exchanger system as recited in claim 10, wherein at least one said additively manufactured heat transfer features is tree-shaped.

12. The heat exchanger system as recited in claim 8, further comprising a multiple of additively manufactured heat transfer features that extend from an outer surface of said additively manufactured heat transfer tubes.

13. The heat exchanger system as recited in claim 12, wherein said additively manufactured heat transfer features are located between said plurality of fins.

14. The heat exchanger system as recited in claim 1, wherein an inlet and an outlet to the serpentine additively manufactured heat transfer tube is on the same side of the additively manufactured plurality of fins.

15. The heat exchanger system as recited in claim 14, wherein the inlet and the outlet are transverse to the air flow direction.

* * * * *